United States Patent [19]

Bueche, Sr.

[11] Patent Number: 4,580,474

[45] Date of Patent: Apr. 8, 1986

[54] TABLE SHEAR

[76] Inventor: Clifford J. Bueche, Sr., 2027 Pleasanton Rd., San Antonio, Tex. 78221

[21] Appl. No.: 653,328

[22] Filed: Sep. 24, 1984

[51] Int. Cl.$^4$ .......................... B26D 1/28; B26D 5/42
[52] U.S. Cl. ......................................... 83/56; 83/386; 83/392; 83/581; 83/468
[58] Field of Search .................. 83/456, 382, 385–387, 83/391, 392, 467 R, 467 A, 468, 378, 581, 595, 596, 383, 384, 56

[56] References Cited

U.S. PATENT DOCUMENTS

| | | | |
|---|---|---|---|
| 1,730,318 | 10/1929 | Bosch | 83/386 |
| 1,908,703 | 5/1933 | Flatt | 83/467 |
| 2,089,274 | 8/1937 | Laukhuff | 83/387 |
| 2,254,374 | 9/1941 | Laukhuff | 83/387 |
| 2,641,845 | 6/1953 | Gundlach | 83/468 X |
| 4,331,020 | 5/1982 | Cros | 83/468 X |

OTHER PUBLICATIONS

Hermes table shear advertisement, published 1983.
Hold Down Clamp advertisement, published Jan., 1979.

Primary Examiner—James M. Meister
Assistant Examiner—John L. Knoble
Attorney, Agent, or Firm—Gunn, Lee & Jackson

[57] ABSTRACT

An improved table shear, and method for using same, for cutting sheet metal in precise dimensions. The table shear includes a hold down clamp in operative engagement with the cutting blade leverage mechanism. The clamp impinges against the sheet metal before the blade begins to cut, thereby preventing movement of the sheet metal during the shearing process. The clamp also protects the operator from the cutting blade during the shearing operation.

16 Claims, 8 Drawing Figures

TABLE SHEAR

BACKGROUND OF THE INVENTION

This invention relates to an improved table shear having a clamp mechanism for preventing movement of the metal plate to be cut during the shearing process.

Table shears or plate cutters are typically utilized to cut pieces of metal in precise dimensions for subsequent use in the manufacture of trophy columns or other metal objects. A conventional table shear includes a table having a table blade on one end thereof, a raised rule along the length of the table for measuring the metal plate to be cut, a cutting blade, and a leverage mechanism for driving the cutting blade downward in proximity to the table blade. As the cutting blade is driven downward, it slices the metal plate from one edge of the plate to the opposite edge.

It is very important that the metal plate be cut in precise dimensions; if not, intolerances may impede the proper manufacture of an object with the cut pieces of metal. However, the initial downward cutting action of the blade at an angle, perpendicular to the plate, typically causes the metal plate to move or shift, thereby causing the blade to cut the plate along an undesired line of cut. In addition to minimizing plate movement, it is also important that the table shear have a safety guard to protect the operator's hands and fingers during the cutting process.

Prior attempts to alleviate the shifting of the metal sheet during the initial cutting stage of a table shear have included the use of a plurality of spring activated clamps. Such clamps must initially be attached to the cutting blade support with the metal plate thereafter placed beneath each of the spring loaded legs. After the plate is cut, each of the legs must be raised to permit removal of the metal piece. Since the spring activated clamps operate independent of the cutting blade leverage mechanism, their use is cumbersome, time consuming, and not deemed to provide sufficient shifting impedance. Various types of safety guards or blade shields have also been developed.

SUMMARY OF THE INVENTION

Accordingly, the present invention provides a table shear, and method for using same, having a clamp mechanism in operative engagement with the cutting blade for preventing movement of sheet metal during the cutting thereof and shielding the blade during the use thereof. The table shear includes a table having an adjustable table blade on one end thereof, an adjustable, stainless steel rule guide along the side thereof, and an adjustable mitre in the center thereof. The table shear is also provided with a adjustable backstop which may be utilized to maintain the sheet metal in the desired position atop the table.

The present invention also includes a leverage mechanism including a cutting blade handle, a cutting blade head, and a cutting blade secured to the head. The leverage mechanism is adapted to drive the cutting blade downward across the metal sheet in proximity to the table blade. The clamp mechanism extends the length of the cutting blade in operative engagement with the cutting blade and cutting blade head for preventing plate movement and protecting the operator's hands and fingers.

During the shearing operation, the cutting blade is raised by means of the leverage mechanism and the sheet metal or workpiece is placed atop the table. The amount or length of metal to be cut is determined by the rule guide, and the mitre or backstop is adjusted accordingly, depending upon the direction the sheet metal is to be fed. As the table shear operator thereafter presses downward on the handle, the cutting blade head urges the hold down clamp downward to impinge against the metal sheet. Once the downward motion of the hold down clamp has been impeded and the metal sheet is secure against the table top, the sliding, operative engagement between the cutting blade head and the hold down clamp permits the continued downward motion of the cutting blade to shear the metal sheet. The handle may thereafter be raised, thereby raising the cutting blade and hold down clamp, to remove the cut metal piece from the table top.

The improved table shear thus provides a hold down clamp in operative engagement with the leverage mechanism. The hold down clamp grips the sheet metal before the cutting blade begins to cut the sheet, thereby preventing movement of the sheet and permitting a straight cut in the desired line. The hold down clamp also protects the operator's hands and fingers from the cutting blade during the shearing operation.

DETAILED DESCRIPTION OF THE PREFERRED EMBODIMENT

Figures 1, 2:
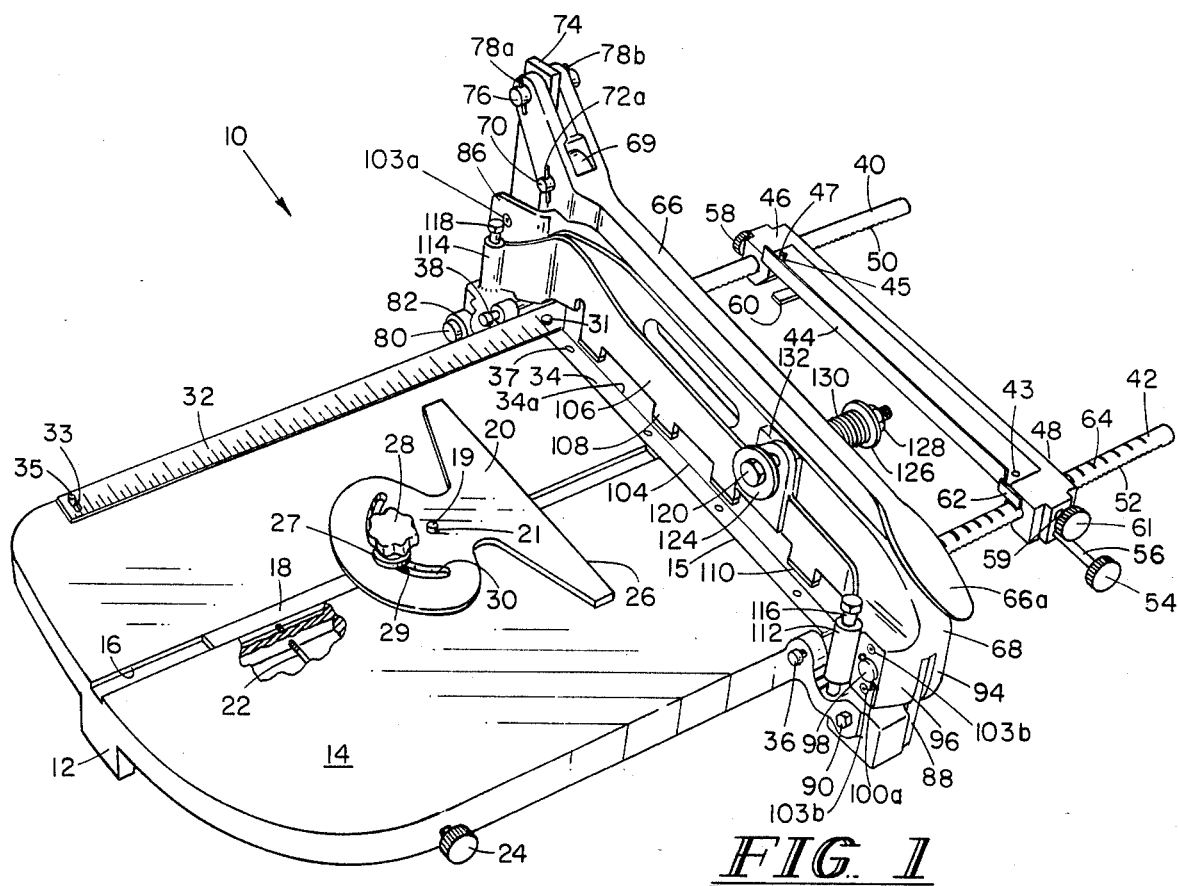
FIG. 1 is a perspective, frontal view of a preferred embodiment of an improved table shear.
FIG. 2 is a perspective, rear view of a preferred embodiment of an improved table shear.

Referring to FIG. 1, the preferred embodiment of an improved table shear is identified by the number 10. The table shear 10 includes a base 12 having a horizontal table top 14 on the uppermost surface thereof. Table 14 has a longitudinal channel 16 located in approximately the center thereof within which to receive a longitudinal base 18. Base 18 is adapted for operative engagement with an adjustable mitre 20 by means of an upstanding pin 19 connected to base 18 and an orifice 21 in mitre 20 within which to receive pin 19.

The position of mitre 20 atop and along the length of table 14 is adjusted by means of a mitre locking rod 22 which is adapted to impinge against mitre base 18 to impede the longitudinal movement of mitre 20. Locking rod 22 preferably extends through a passage in base 12 approximately perpendicular to mitre base 18 and has an exterior, rotable handle or knob 24. At least a portion of mitre locking rod 22 is in threaded engagement with a portion of base 12, as illustrated in FIG. 1, thereby to effectuate relative movement of the forward end of mitre locking rod 22, opposite knob 24, toward or away from mitre base 18 upon rotation of knob 24.

Figure 3:
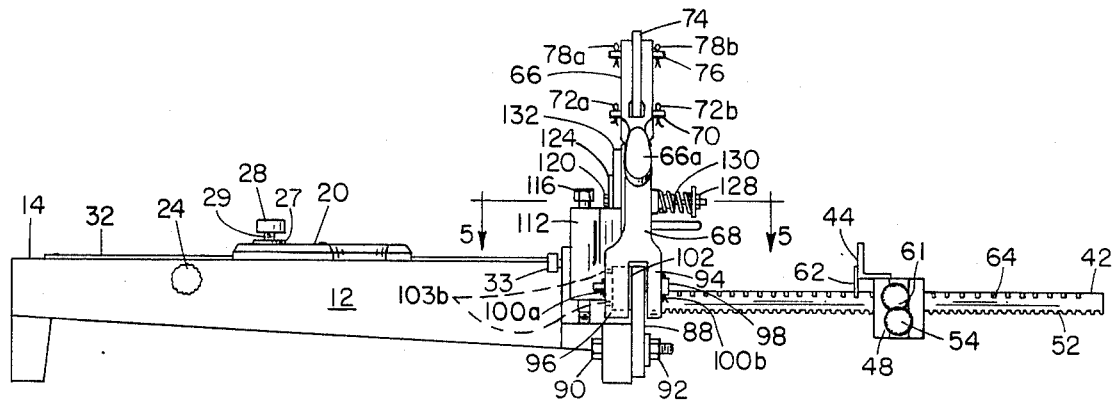
FIG. 3 is a side plan view of a preferred embodiment of an improved table shear.

The angle of incidence of the leading edge 26 of mitre 20 with respect to longitudinal channel 16 may also be adjusted by loosening knob 28 and rotating mitre 20 to the desired angle about pivot pin 19. Knob 28 has a threaded shaft 29 secured thereto, as illustrated in FIG. 3, which extends through a washer 27 and an arcuate groove 30 and is in threaded engagement with base 18. Knob 28 and washer 27 may be loosened, by rotating knob 28 in a first direction, and mitre 20 rotated through groove 30 about pin 19 to provide the desired angle of incidence. Knob 28 and washer 27 may thereafter be tightened against mitre 20 to maintain the aforementioned angle of incidence by rotating knob 28 in a second, opposite direction. Swivel mitre 20 enables the operator to cut precise angles from 0° to 90°.

Referring again to FIG. 1, the improved table shear 10 is also provided with a raised, calibrated rule 32 along the length of table 14. Calibrated rule 32 is preferably constructed of stainless steel and has a length of approximately 18 inches. The position of rule 32 may be adjusted by means of a pivot pin 31 which extends through an end of rule 32 into base 12 and a groove 33 on the opposite end thereof having a position maintenance screw 35 therein connected in threaded engagement to base 12.

The forward end 15 of table 14 is provided with an adjustable table blade 34, having a cutting edge 34a, which extends across table 14 approximately perpendicular to longitudinal channel 16 and rule 32. Table blade 34 is provided with a plurality of countersunk bolt holes 37, each of which is adapted to receive a countersunk bolt (not shown). Each of the countersunk bolts extend through and below a groove (not shown) machined on the underside of base 12 which is approximately parallel to channel 16. Table blade 34 is adjusted toward or away from the forward end 15 of table 14 or upper cutting blade 104 by loosening the nuts (not shown) on the opposite end of the aforementioned table blade bolts and sliding table blade 34 along the length of the aforementioned table blade grooves. The position of table blade 34 is thereafter maintained by tightening the aforementioned table blade nuts and by rotating blade abutment bolts 36 and 38, which are in threaded engagement with base 12. Upon appropriate rotation, the opposite ends of bolts 36 and 38 will abut against table blade 34, thereby prohibiting movement of table blade 34 toward table edge 15.

Referring to FIG. 2 and FIG. 3, identical numbers will be utilized for identical components. The improved table shear 10 is further provided with a pair of extension rods 40 and 42 which extend longitudinally outward from, and are connected to, base 12. Extension rods 40 and 42 support an adjustable, one piece aluminum angle or backstop 44 which extends between the respective extension rods. Backstop 44 is appropriately supported by and mounted on each end thereof to a first bracket or pinion gear housing 46 and a second bracket or pinion gear housing 48. Housings 46 and 48 are part of a single casting with aluminum angle 44 resting on the top thereof. The position of backstop 44 may be adjusted by means of a pivot pin 43, connected between backstop 44 and housing 48, and a groove 45, having a position maintenance screw 47 therein connected in threaded engagement to housing 46. Extension rods 40 and 42 have a rack 50 and 52, respectively, on the underside thereof for gearing with an appropriate pinion gear mechanism (not shown) located within housings 46 and 48, respectively.

The movement of backstop 44 away from or toward table 14 along the length of extension rods 40 and 42 is effectuated by rotating a knob 54. The rotation of knob 54 likewise effectuates rotation of the pinion gear mechanism (not shown) within housing 48, engaged with rack 52, and the pinion gear mechanism (not shown) within housing 46, engaged with rack 50, both by means of pinion rod 56. When the backstop 44 has reached the desired position along the length of rods 40 and 42, it may be locked in place by means of locking knobs 58 and 61. Knobs 58 and 61 are connected to shafts 57 and 59, respectively, which are in threaded engagement with housings 46 and 48, respectively. Rotation of knobs 58 and 61 in a first direction will cause the opposite ends of shafts 57 and 59, respectively, to abut against rods 40 and 42, respectively, thereby locking backstop 44 into position. Rotation of knobs 58 and 61 in a second, opposite direction, will permit movement of the backstop 44 along the length of rods 40 and 42.

Backstop 44 is also provided with a moveable position guide strip 60 on the underside thereof extendable outward therefrom approximately perpendicular thereto when in operating position. Guide strip 60 is connected on the underside of backstop 44 by a pivot pin (not shown) to permit the pivoting of strip 60 completely beneath the underside of backstop 44. Backstop 44 is also provided with a stop position clip 62 extending outward therefrom approximately parallel therewith in proximity to housing 48. Stop position clip 62 is adapted to be received within any one of a plurality of notches 64 located atop extension rod 42 in one inch (1") increments to provide exact measured positioning of backstop 44 in relation to the cutting edge 34a of table blade 34, as illustrated in FIG. 3.

Figure 4:
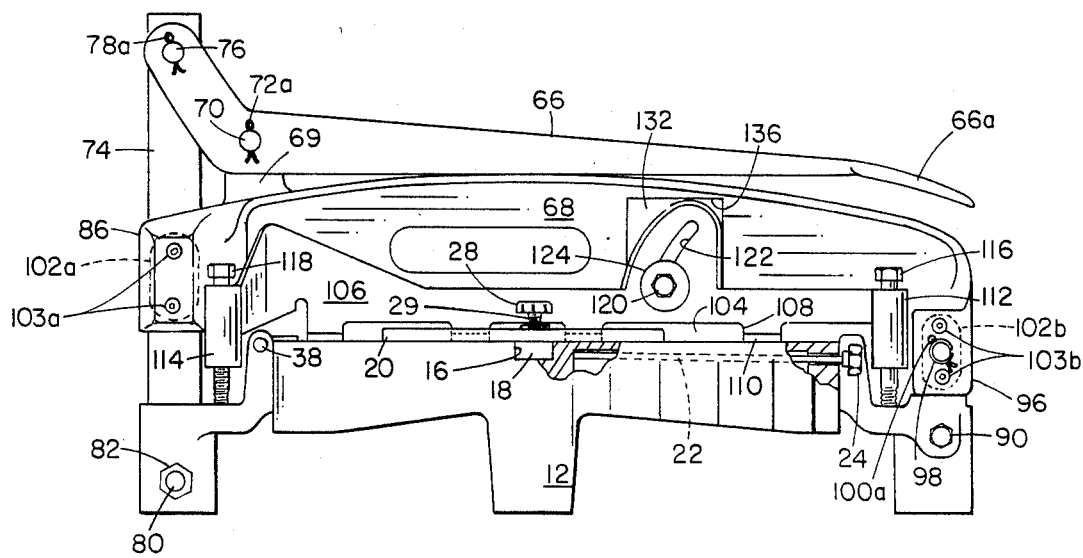
FIG. 4 is a front plan view of a preferred embodiment of an improved table shear.

Referring to FIG. 3 and FIG. 4, the leverage mechanism utilized in conjunction with the improved table shear 10 is shown, with identical numerals again identifying identical components. The leverage mechanism includes a handle 66 connected in operative engagement with a cutting blade head 68. Handle 66 is connected to cutting blade head 68 by means of a first pinion 70 and a first pair of cotter pins or spring ring clips 72a and 72b extending through opposite ends of pinion 70. Pinion 70 extends through a V-shaped portion of handle 66 opposite hand grip 66a and an upwardly extending boss 69 of head 68. Handle 66 is also connected to the uppermost portion of a fixed leverage bar 74 by means of a second pinion 76 through handle 66 and bar 74 and a second pair of cotter pins or spring ring clips 78a and 78b extending through opposite ends of pinion 76. The lowermost portion of leverage bar 74 is fixedly secured to base 12 by a bolt 80 through base 12 and bar 74 and a nut 82. As illustrated in FIG. 2, cutting blade head 68 is also provided with a pair of protruding arms 84 and 86 adapted to move up and down along the opposite sides of leverage bar 74 as leverage handle 66 is raised and lowered, respectively.

As illustrated in FIG. 3, cutting blade head 68 is pivotally mounted to base 12 by a pivot bar 88 which is secured to base 12 by means of a bolt 90 through bar 88 and base 12 and a nut 92. Cutting blade head 68 has a pair of downwardly extending arms 94 and 96 which surround the uppermost portion of pivot bar 88 and are connected thereto by means of a pinion 98 therethrough having a pair of cotter pins or spring ring clips 100a and 100b extending through opposite ends of pinion 98. As illustrated in FIG. 4, a pair of bronze, oval shaped plate bearings 102a and 102b are located at opposite ends of moveable cutting blade head 68 between arms 86 and 96 and leverage bar 74 and pivot bar 88, respectively. Plate bearings 102a and 102b may be adjusted to permit the pivoting of head 68 and desired operation of the leverage mechanism by Allen head bolts 103a and 103b, respectively. Bolts 103a and 103b are in threaded engagement with arms 86 and 96, respectively, and when tightened, abut against bearings 102a and 102b, respectively, for adjusting the drag of the respective bearings. The cutting blade head 68 supports a carbon or tool steel cutting blade 104 which is appropriately connected thereto on the lowermost portion thereof approximately parallel and perpendicular to the edge 34a of table blade 34.

The improved table shear 10 is further provided with a hold down clamp 106, as illustrated most clearly in FIG. 1 and FIG. 4. Hold down clamp 106 extends across table 14 above and approximately parallel and perpendicular to table blade 34. Clamp 106 is provided with a plurality of legs 108 which may be provided with compression pads 110 on the lowermost portions thereof. The clamp 106 is further provided with first and second cylindrical bushing guides 112 and 114 on the opposite ends thereof which are secured about a pair of stop screws 116 and 118, respectively. The lowermost portions of stop screws 116 and 118 are in threaded engagement with base 12, thereby permitting upward or downward adjustment of screws 116 and 118 upon appropriate rotation thereof.

Figure 5:
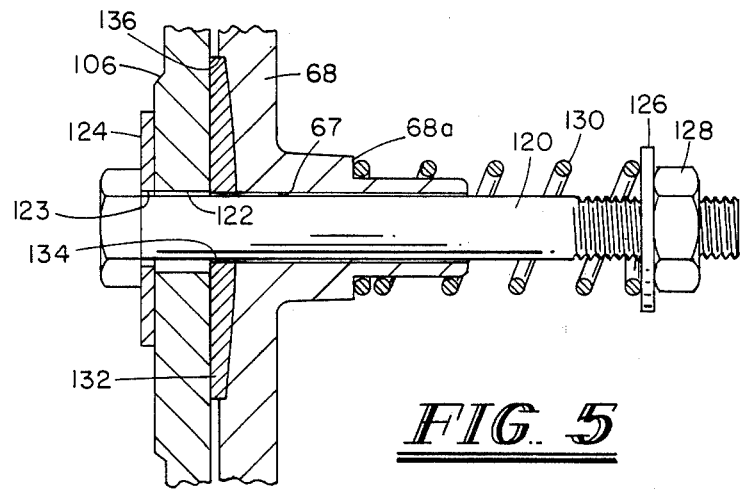
FIG. 5 is a cross-sectional view taken along section lines 5—5 of FIG. 3 illustrating the operative engagement between the hold down clamp and cutting blade head.

As illustrated in FIG. 4 and FIG. 5, a clamp bolt 120 extends through an arcuate groove 122 in the uppermost portion of hold down clamp 106. Clamp bolt 120 extends through a passage 123 in a first bearing washer 124, a passage 67 through head 68, a second washer 126, and has a nut 128 in threaded engagement therewith. A clamp spring or a solid compressionable material, such as neophrene rubber, 130 is positioned between washer 126 and a shoulder 68a of cutting blade head 68. A bronze plate bearing 132 having a hole 134, through which bolt 120 extends, is located in a well 136 on head 68 intermediate clamp 106 and head 68. The tightening or loosening of nut 128 provides the desired friction or drag on the clamp 106 and respective surfaces between bronze plate bearing 132 and bronze bearing washer 124 in caliper fashion.

Figure 6:
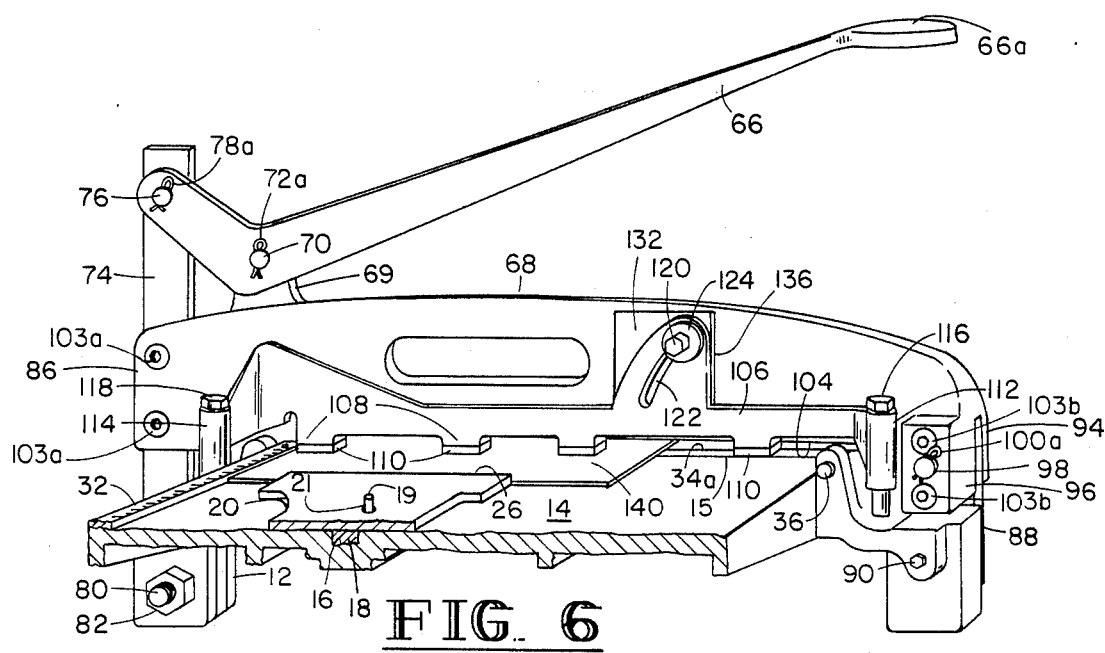
FIG. 6–FIG. 8 is a sequential perspective view illustrating a preferred shearing method utilizing a preferred embodiment of an improved table shear.
Figure 7:
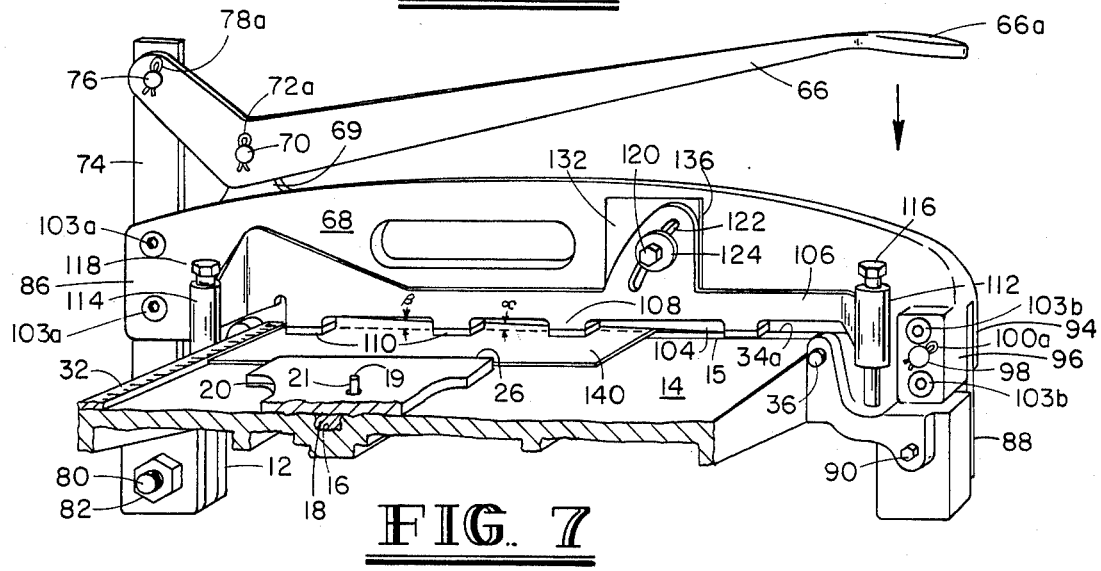
Figure 8:
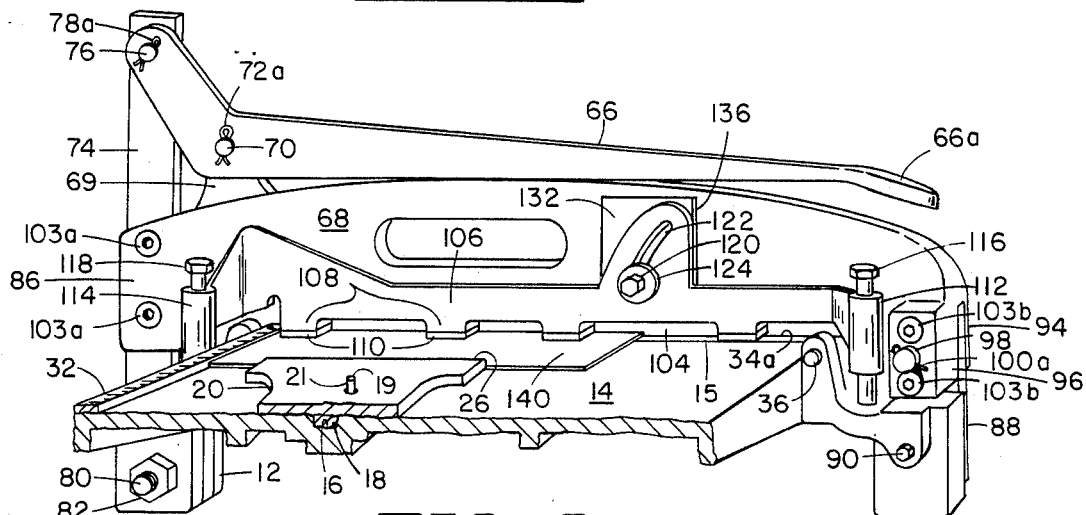

A method for utilizing the improved table shear 10 to cut a piece of sheet metal 140 is shown sequentially in FIG. 6–FIG. 8. It is to be understood that like numerals are utilized for identical components and that in the preferred embodiment illustrated, the sheet metal 140 is fed or placed atop table 14 from the rear of shear 10. In such a feeding mode, the backstop 44 will not be utilized. It is also to be understood that the table blade 34 will have been previously adjusted prior to the initiation of the shearing process. To accomplish such, the upper cutting blade 104 is lowered, as illustrated in FIG. 1, and the table blade 34 is adjusted relative thereto, as heretofore described, to permit less than a one thousandths inch (0.001") clearance between the respective blades.

The handle 66 of the improved table shear 10 is initially raised by handle grip 66a, thereby lifting head 68, cutting blade 104, and clamp 106 away from table 14, as illustrated in FIG. 6. In this position, bolt 120 is in the uppermost portion of arcuate groove 122 when handle 66 is raised up. It is to be understood that the heads of stop screws 116 and 118 will limit the height to which clamp 106 may be raised; however, the height of the respective heads of screws 116 and 118 may be adjusted accordingly, as previously described. The metal piece 140 is thereafter placed atop table 14 or fed from the rear of shear 10 with the edge of piece 140 flush against the raised rule 32. The desired length of the metal piece 140 is thereafter measured with the rule 32, the desired length of plate 140 resting atop table 14. The mitre 20 is thereafter adjusted to permit the leading edge 26 to be flush with the edge of sheet 140, as further illustrated in FIG. 6.

Once the metal piece 140 has been properly positioned atop table 14, the shear operator may begin pressing downward on handle grip 66a, as illustrated by the arrow in FIG. 7. The handle 66 thereafter begins to urge the cutting blade head 68 and cutting blade 104 downward. Arms 84 and 86 likewise slide downward along bar 74 as head 68 pivots about bar 88. However, due to the friction or drag between clamp 106 and head 68, as illustrated in FIG. 5, the clamp or hold down 106 will also be urged downward, thereby causing legs 108 and pads 110 to impinge against the uppermost surface of metal plate 140. The pads 110 thus press the metal piece 140 against blade 34 prior to the initial cutting of piece 140 by blade 104, as illustrated in FIG. 7. That is, cutting blade 104 is normally driven downward toward and across plate 140 at an angle between the edge of blade 104 and the desired line of cut, shown as a dashed line in FIG. 7. The angle alpha ($\alpha$) nearest bushing guide 112 is smaller than the angle beta ($\beta$), due in part to a slight angle at the midpoint of blade 104. As such, cutting blade 104 will begin to cut plate 140 along the edge thereof nearest bushing guide 112 and proceed therefrom through and across plate 140. This progressive cutting across plate 140 is what normally causes the plate 140 to shift atop table 14 resulting in an undesired line of cut. Due to the impingement of pads 110 against metal piece 140, however, the initial cutting of piece 140 by blade 104 does not cause the piece 140 to shift as normally occurs with conventional table shears.

Once the clamp 106 is secured against the metal 140, the downward motion of clamp 106 will remain impeded by table 14 and/or blade 34 while the downward motion of head 68 will continue. That is, the downward force of head 68 counteracted by the upward force of clamp 106 will exceed the tension between head 68 and clamp 106 interfaced by bearing 132 and bearing washer 124. However, such tension does continue to urge clamp 106 downward as head 68 is pressed downward. The downward motion of head 68 and simultaneous shearing of plate 140 by blades 34 and 104 is facilitated by the downward passage of bolt 120 within and along arcuate groove 122, as illustrated in FIG. 7 and FIG. 8. However, bolt 120 does not move downward from the uppermost portion of groove 122 until pads 110 abut plate 140. Blade 104 is thus able to progressively shear completely through the metal piece 140 at an angle, as heretofore described, along the desired line of cut, while the clamp 106 prohibits any movement of the metal piece 140 during the shearing process.

Once the shearing process is completed, the handle 66 can be raised by grip 66a, thereby simultaneously lifting cutting blade 104, head 68, and clamp 106 away from table 14, to the extent permitted by screws 116 and 118, to permit the removal of cut piece 140. Bolt 120 will likewise be raised again to the uppermost portion of groove 122 if handle 66 is raised to its uppermost position. It is to be understood that the tension between clamp 106 and cutting blade head 68 can be adjusted by tightening or loosening nut 128, thereby permitting the desired operative engagement between the head 68 and clamp 106. It is also to be understood that the clamp 106 functions as a shield to protect the operator's hands and fingers from the cutting blade 104 during the shearing process.

In an alternate feeding mode, mitre 20 is removed from table 14 by sliding base 18 completely out of channel 16 or simply removing mitre 20 from engagement with base 18. In this feeding mode, backstop 44 is utilized as an abutment against an edge of metal piece 140. Backstop 44 must initially be adjusted by rotating knob 54 until backstop 44 is flush with table blade 34 to assure that backstop 44 is parallel therewith. However, guide strip 60 must first be pivoted beneath the underside of backstop 44. Knob 54 is thereafter rotated until backstop 44 is the desired distance away from table blade 34, while the position clip 62 rests within a notch 64 to assure that the backstop 44 is the desired distance away from table 14 to thereby assure the cutting of matched lengths. The simultaneous movement of housings 46 and 48 along racks 50 and 52 assure that the backstop 44 provides a straight line along the edge of sheet 140. Once the backstop 44 is in the desired position away from table 14, the respective pinion gears may be locked in place by rotating knobs 58 and 61. The guide strip 60 may thereafter be pivoted outward to help support the plate 140. The plate 140 is thereafter fed from the front of shear 10 and cut in accordance with the previously described method with backstop 44 abutting an edge thereof.

In the preferred embodiment, table blade 34 has a thickness of approximately one-fourth inch (¼") and a width of approximately one and one-fourth inches (1¼"). Cutting blade 104 has a thickness of approximately one-fourth inch (¼") and a width of approximately one and one-half inches (1½"). Table 14 has a surface of approximately fifteen inches (15") by twenty inches (20") and notches 64 are approximately one inch (1") apart. Finally, the various components of shear 10 are preferably machined in a conventional fashion with blades 34 and 104 made of hardened tool steel.

While the improved table shear and method for using same have been described in connection with the preferred embodiment, it is not intended to limit the invention to the particular form set forth, but on the contrary, it is intended to cover such alternatives, modifications, and equivalents as may be included within the spirit and scope of the invention as defined by the appended claims.

I claim:

1. A method for cutting a metal plate along a desired line of cut, comprising the steps of:

placing said metal plate atop a table having a table blade connected thereto on one end thereof;

measuring said metal plate to determine said desired line of cut and positioning said plate accordingly atop said table;

pressing down on a handle in levered engagement with a cutting blade head having a cutting blade connected thereto, said pressing step driving said cutting blade toward and across said plate, said pressing step applying frictional drag on a clamp to press said clamp against said plate upon driving of said cutting blade toward and across said plate, said pressing step causing a bolt extending through a groove in said clamp to slide downward through said groove toward said plate during said pressing of said clamp against said plate and driving of said cutting blade across said plate, said clamp maintaining said plate in said desired position to permit said table blade and cutting blade to cut said plate along said desired line of cut; and lifting said handle, thereby lifting said clamp and cutting blade to remove said cut metal plate.

2. A method for cutting a metal plate, as recited in claim 1, comprising the additional step of adjusting the position of said table blade prior to said placing of said metal plate atop said table.

3. Apparatus for cutting a metal plate along a desired line of cut, comprising:

a table for receiving said plate thereon;

a table blade connected to said table;

a head connected to said table and a cutting blade for driving said cutting blade toward and across said plate;

a clamp for pressing against said plate prior to and during said driving of said cutting blade across said plate; and means for applying frictional drag on said clamp, including a bolt extending through a groove in said clamp, to press said clamp against said plate upon driving of said cutting blade toward and across said plate, said groove in said clamp adapted to permit said bolt to slide downward through said groove toward said plate during said pressing of said clamp against said plate and driving of said cutting blade across said plate, said clamp maintaining said metal plate in a desired position atop said table to permit said cutting blade and table blade to cut said plate along said desired line of cut.

4. Apparatus for cutting a metal plate, as recited in claim 3, further comprising means connected to said table for impinging against an edge of said plate prior to and during said cutting of said plate.

5. Apparatus for cutting a metal plate, as recited in claim 4, wherein said edge impinging means comprises an adjustable mitre in sliding engagement with said table.

6. Apparatus for cutting a metal plate, as recited in claim 4, wherein said edge impinging means comprises a backstop in geared engagement with at least one extension rod connected to said table.

7. Apparatus for cutting a metal plate, as recited in claim 6, wherein said apparatus further comprises a guide strip pivotally connected to said backstop for supporting said metal plate.

8. Apparatus for cutting a metal plate, as recited in claim 3, further comprising a raised, adjustable rule connected to said table, extending approximately the length of said table, for measuring said plate prior to said cutting thereof.

9. Apparatus for cutting a metal plate, as recited in claim 3, further comprising handle means in levered engagement with said head for raising or lowering said cutting blade relative to said table blade.

10. Apparatus for cutting a metal plate, as recited in claim 3, wherein said bolt extends through a passage in said head and said means for applying frictional drag further comprises a nut for fitting on one end of said bolt opposite a head of said bolt and a spring surrounding said bolt intermediate said nut and said cutting head.

11. Apparatus for cutting a metal plate, as recited in claim 3, wherein said means for applying frictional drag further comprises a bearing intermediate said head and said clamp and a washer held against said clamp by said bolt on a side of said clamp opposite said bearing.

12. Apparatus for cutting a metal plate, as recited in claim 3, wherein said bolt extends through a passage in said head and said means for applying frictional drag further comprises a nut for fitting on one end of said bolt opposite a head of said bolt and a spring surrounding said bolt intermediate said bolt head and said cutting head.

13. Apparatus for cutting a metal plate, as recited in claim 3, further comprising means for impeding upward movement of said clamp.

14. Apparatus for cutting a metal plate along a desired line of cut, comprising:
- a base including a table for receiving said plate thereon;
- a head connected to said base and a cutting blade for driving said cutting blade toward and across said plate;
- a clamp for pressing against said plate prior to and during said driving of said cutting blade across said plate;
- means for applying frictional drag on said clamp, including a bolt extending through a groove in said clamp and a passage in said head, to press said clamp against said plate upon driving of said cutting blade toward and across said plate, said groove in said clamp adapted to permit said bolt to slide downward through said groove toward said plate during said pressing of said clamp against said plate and driving of said cutting blade across said plate, said clamp maintaining said metal plate in a desired position atop said table to permit said cutting blade to cut said plate along said desired line of cut;
- an adjustable mitre in sliding engagement with said table for impinging against said plate prior to and during said cutting of said plate; and
- a backstop in geared engagement with at least one extension rod connected to said base for impinging against said plate prior to and during said cutting of said plate, said backstop further comprising a pivotal guide strip adapted for supporting said metal plate.

15. Apparatus for cutting a metal plate, as recited in claim 14, wherein said means for applying frictional drag further comprises a bearing intermediate said head and said clamp and a washer held against said clamp by said bolt on a side of said clamp opposite said bearing.

16. Apparatus for cutting a metal plate, as recited in claim 15, wherein said means for applying frictional drag further comprises a nut for fitting on one end of said bolt opposite a head of said bolt and a spring surrounding said bolt intermediate said nut and said cutting head.

* * * * *